United States Patent
Ball et al.

(10) Patent No.: US 10,302,219 B2
(45) Date of Patent: May 28, 2019

(54) ADJUSTABLE OPERATING ROD FOR A HYDRANT

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 15/866,708

(22) Filed: Jan. 10, 2018

(65) Prior Publication Data

US 2018/0187796 A1    Jul. 5, 2018

Related U.S. Application Data

(63) Continuation of application No. 15/373,132, filed on Dec. 8, 2016, now Pat. No. 9,885,426, which is a continuation of application No. 14/869,679, filed on Sep. 29, 2015, now Pat. No. 9,546,741, which is a continuation of application No. 14/490,133, filed on Sep. 18, 2014, now Pat. No. 9,212,471, which is a continuation of application No. 13/428,120, filed on Mar. 23, 2012, now Pat. No. 8,844,558.

(60) Provisional application No. 61/467,790, filed on Mar. 25, 2011.

(51) Int. Cl.
*F16K 31/60* (2006.01)
*E03B 9/02* (2006.01)

(52) U.S. Cl.
CPC ............. *F16K 31/60* (2013.01); *E03B 9/025* (2013.01); *E03B 9/027* (2013.01); *Y10T 137/5109* (2015.04); *Y10T 137/5456* (2015.04); *Y10T 137/5497* (2015.04); *Y10T 137/7014* (2015.04); *Y10T 137/7017* (2015.04)

(58) Field of Classification Search
CPC .... F16K 31/60; Y10T 137/5497; E03B 9/025; E03B 9/027
See application file for complete search history.

(56) References Cited

U.S. PATENT DOCUMENTS

| | | | |
|---|---|---|---|
| 4,266,320 A | 5/1981 | Grant | |
| 5,024,469 A | 6/1991 | Aitken et al. | |
| 5,033,500 A * | 7/1991 | Hoeptner, III | ............ E03B 7/12 |
| | | | 137/282 |
| 5,697,393 A | 12/1997 | Mirlisena, Sr. | |
| 5,738,140 A | 4/1998 | Mann | |
| 5,752,542 A | 5/1998 | Hoeptner, III | |
| 5,979,490 A | 11/1999 | Mirlisena, Sr. | |
| 6,302,250 B1 | 10/2001 | Sadow et al. | |
| 8,844,558 B2 | 9/2014 | Ball et al. | |
| 9,212,471 B2 | 12/2015 | Ball et al. | |

(Continued)

OTHER PUBLICATIONS

"Freezeless Anti-Siphon Wall Facet" Woodford Mfg., Nov. 2010 Catalog, 2 pages.

(Continued)

*Primary Examiner* — Kevin Lee

(57) ABSTRACT

An adjustable operating rod assembly is provided. In one embodiment a telescoping rod and tube are provided such that the length of the operating rod can be selectively adjusted in order to accommodate fluid inlet pipes of various lengths and regardless of manufacturer.

19 Claims, 7 Drawing Sheets

(56) References Cited

U.S. PATENT DOCUMENTS

| | | |
|---|---|---|
| 9,546,741 B2 | 1/2017 | Ball et al. |
| 9,885,426 B2 | 2/2018 | Ball et al. |
| 2010/0206392 A1 | 8/2010 | Ball et al. |

OTHER PUBLICATIONS

Official Action for U.S. Appl. No. 13/428,120, dated Mar. 20, 2014, 10 pages.
Notice of Allowance for U.S. Appl. No. 13/428,120, dated Jul. 8, 2014, 7 pages.
Official Action for U.S. Appl. No. 14/490,133, dated Feb. 23, 2015, 9 pages.
Final Action for U.S. Appl. No. 14/490,133, dated Jun. 9, 2015, 9 pages.
Notice of Allowance for U.S. Appl. No. 14/490,133, dated Aug. 20, 2015, 7 pages.
Official Action for U.S. Appl. No. 14/869,679, dated Mar. 2, 2016, 9 pages.
Notice of Allowance for U.S. Appl. No. 14/869,679, dated Sep. 13, 2016, 5 pages.
Office Action for U.S. Appl. No. 15/373,132, dated Mar. 20, 2017 8 pages.
U.S. Appl. No. 15/373,132, Notice of Allowance dated Sep. 20, 2017, 7 pages.

* cited by examiner

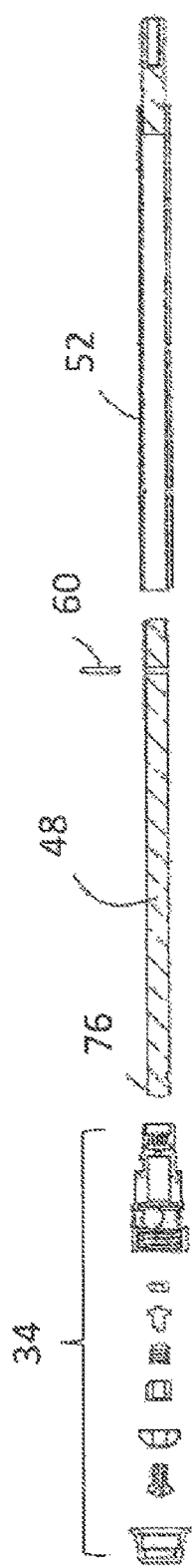
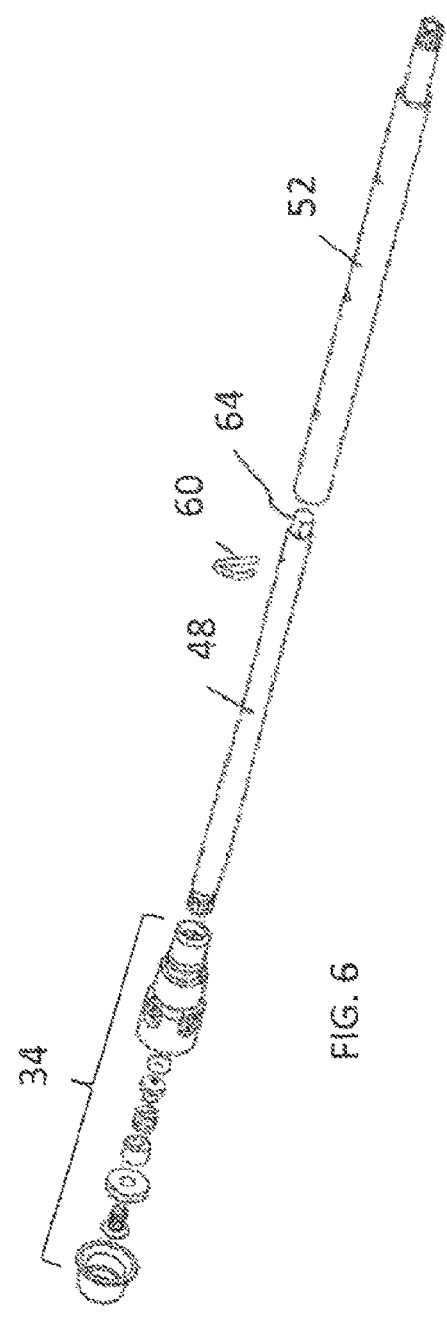

ADJUSTABLE OPERATING ROD FOR A HYDRANT

This application is a Continuation of and claims the benefit of priority from U.S. patent application Ser. No. 15/373,132, filed Dec. 8, 2016 and issued as U.S. Pat. No. 9,885,426, which is a Continuation of and claims the benefit of priority from U.S. patent application Ser. No. 14/869,679, filed Sep. 29, 2015 and issued as U.S. Pat. No. 9,546,741, which is a Continuation of and claims the benefit of priority from U.S. patent application Ser. No. 14/490,133, filed Sep. 18, 2014 and issued as U.S. Pat. No. 9,212,471, which is a Continuation of and claims the benefit of priority from U.S. patent application Ser. No. 13/428,120, filed Mar. 23, 2012 and issued as U.S. Pat. No. 8,844,558 on Sep. 30, 2014, which claims the benefit priority from U.S. Provisional Patent Application Ser. No. 61/467,790, filed Mar. 25, 2011, the entire disclosures of which are incorporated by reference herein.

FIELD OF THE INVENTION

Embodiments of the present invention are generally related to wall hydrants for selectively delivering fluid. The wall hydrant of one embodiment employs an inlet valve that is actuated with an operating rod of adjustable length.

BACKGROUND OF THE INVENTION

Wall hydrants are commonly used for supplying water and generally include a housing with a handle rotatably interconnected thereto. A bore in the housing provides a fluid path from a fluid inlet pipe to a fluid outlet of the housing. The handle is turned to control fluid flow by moving an operating rod located within the fluid inlet pipe in a direction parallel to the longitudinal axis of the fluid inlet pipe. An end of the operating rod opposite the handle is associated with an inlet valve that opens and closes the hydrant.

To replace the operating rod and/or interconnected inlet valve, a plumber must know the length of the inlet pipe, length of the housing, and location of the fluid source interconnection point, the latter two components being located on either side of a wall. Because wall thicknesses vary from structure to structure, estimation of inlet pipe length, etc. is difficult. Thus, during initial hydrant installation or replacement, inlet tubes and associated operating rods must sometimes be modified and customized. Further, as replacement valve components may be of different length than those found in an existing hydrant, the operating rod must sometimes be adjusted to accommodate a valve or valve component length increase or decrease. Unfortunately, operating rods presently in use do not have capability to accommodate varying sizes of fluid inlet pipes or inlet valves, and the operating rod must be modified by the installers which can be expensive. Alternatively, installers must stock and/or transport operating rods of varying lengths.

It is a long felt need to provide an operating rod that is selectively adjustable and easily adapted to accommodate hydrants of various sizes, lengths, and manufactures.

SUMMARY OF THE INVENTION

Accordingly, it is one aspect to provide an adjustable hydrant operating rod that is able to accommodate hydrant assemblies of various lengths. The present invention contemplates an adjustable operating rod that can be installed within a variety of preexisting hydrant assemblies regardless of size or manufacture. Of course, as will be recognized by one of skill in the art, adjustable rods of the present invention are not limited to a particular adjustable length or range. Indeed, a wide variety of lengths and increments of adjustment are contemplated by the present invention. The adjustable operating rod can be used in hydrants made by most, if not all, companies.

In one embodiment, an adjustable operating rod having a first end and a second end is provided. The first end is associated with a handle for manually activating valves of the hydrant assembly. The first end may be associated with a drain valve and interconnected stem screw of a freeze-resistant hydrant as disclosed in U.S. Patent Application Publication No. 20100206392, which is incorporated by reference herein. The second end is associated with an inlet valve that selectively opens and closes to control fluid flow. The operating rod is comprised of an outer, generally hollow, tube positioned about an inner rod. The inner rod and outer tube are capable of moving relative to each other along the longitudinal axis thereof. In one embodiment, the inner rod and the outer tube may have respective apertures that are aligned to accept a pin or similar device that secures the inner rod to the outer tube. In one embodiment, one end of the inner rod is associated with the inlet valve. The proximal end of the operating rod is comprised of an opening in the outer tube that receives an adapter for interconnection to the hydrant handle. One of skill in the art will appreciate that the component members of the adjustable rod may be interconnected in any order and that more than two members may be provided that may be interconnected in any order. Further, it is contemplated that a kit can be provided that has component members of various sizes that can be mixed and matched as needed.

In one particular embodiment, the outer tube is provided with a plurality of spaced apertures that receive a removable pin for connecting the outer tube to the inner rod. A rod end for association with the hydrant handle is soldered, or otherwise interconnected, to at least one of the inner rod or the outer tube. The inner rod has at least one aperture for aligning with one of the plurality of apertures in the outer tube. The inner rod may also have a hexagonal outer profile at one end and is connected to the inlet valve. In one embodiment, a solder joint is provided to hold the outer tube and inner rod together.

Although a pin has been described as securing the outer tube to the inner rod, it will be appreciated by those of skill in the art that the present invention is not limited to a particular pin, pin arrangement, or even a particular number of pins. Indeed, cotter pins, e-clips, c-clips, screws, bolts, devises, and various temporary interconnecting devices are within the scope and spirit of the present invention. Further, the members comprising the adjustable operating rod may be connected in a uni-directional manner wherein adjacent members can be slidingly interconnection but thereafter not able to move relative to each other in an opposite direction. The contemplated pin is easy to install and remove. In addition, the pin is of such size to fit inside the housing and a fluid inlet tube that is interconnected to the housing. Pins and similar devices may be disposed through only a portion of the rod and/or tube (e.g. one wall), or may extend through the entire diameter of the rod and/or tube.

In alternative embodiments, the adjustable operating rod is comprised of telescoping components. The telescoping components may be selectively interconnected by a spring-loaded ball or similar device that prevents relative movement of one component relative to the other component.

Only upon pressing the ball to overcome the spring force will the ball move out of engagement and allow the locked components to collapse or expand relative to each other. In such embodiments, this locking mechanism replaces or supplements the removable pin described above. One of skill in the art will recognize that such biased elements should be of sufficient strength to accommodate torque or bending loads applied to the operating rod as well as resist corrosion.

In yet other embodiments of the present invention, the operating rod comprises two members that are threadably connected which allows the operating rod to selectively lengthen or shorten. In this embodiment, the desired operating rod length may be fixed by using one or more locknuts or interlocking serrated plates that prevent undesired lengthening or shortening of the operating rod. In such embodiments, the length of the operating rod is fixed in a non-discrete manner.

It is another aspect of embodiments of the present invention to provide an adjustable operating rod with indicia associated with the length. For example, where the predetermined apertures and corresponding operating rod lengths equate to 8 inch, 10 inch, and 12 inch final working lengths, such lengths may be etched or engraved on to the inner rod and/or the outer tube. In addition to, or in lieu of, such engravings, color coding indicia may be provided where different colors correspond to different lengths, or sub lengths. Additionally, external hydrant elements, such as the housing or the end of the operating rod, may share the contemplated engraved or color-coding scheme to facilitate identification of operating rod length and installation. For example, pre-installed elements may comprise a color-coded feature indicating that a 10 inch operating rod is required and a 10 inch operating rod bearing the same color may quickly and easily be selected for installation.

Various additional methods are contemplated for adjusting and fixing the length of the operating rod. For example, the inlet valve may be interconnected to the inner rod having an outer spline that is interconnected to a corresponding spline on an inner surface of the valve. These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

It is another aspect of the present invention to provide a fluid delivery hydrant, comprising: a fluid housing; a fluid inlet pipe having a first end interconnected to the fluid housing; an inlet valve associated with a second end of the fluid inlet pipe; an operating rod positioned within the fluid inlet pipe, the operating rod being associated on one end with a means for controlling fluid flow through the fluid inlet pipe, the length of the operating rod being adjustable and further comprised of: an inner rod having a first end and a second end; an outer tube having a first end and a second end, the inner tube having an inner diameter greater than an outer diameter of the outer rod and at least a portion of the length of the inner rod being disposed within at least a portion of the length of the outer tube; a plurality of apertures comprising at least one aperture provided in the outer tube and at least one aperture provided in the inner rod; and a preferably rigid pin for optionally inserting into the plurality of apertures to secure the inner rod and the outer tube at a desired length.

It is still yet another aspect of the present invention to provide a fluid delivery hydrant, comprising: a fluid housing; a fluid inlet pipe having a first end interconnected to the housing; a means for controlling fluid flow associated with a second end of the fluid inlet pipe; and an operating rod positioned within the fluid inlet pipe, the operating rod being associated on one end, the length of the operating rod being adjustable.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

FIG. 5 is an exploded elevation view of the operating rod of FIG. 1;

FIG. 6 is an exploded perspective view of the operating rod of FIG. 2;

Figure 1:
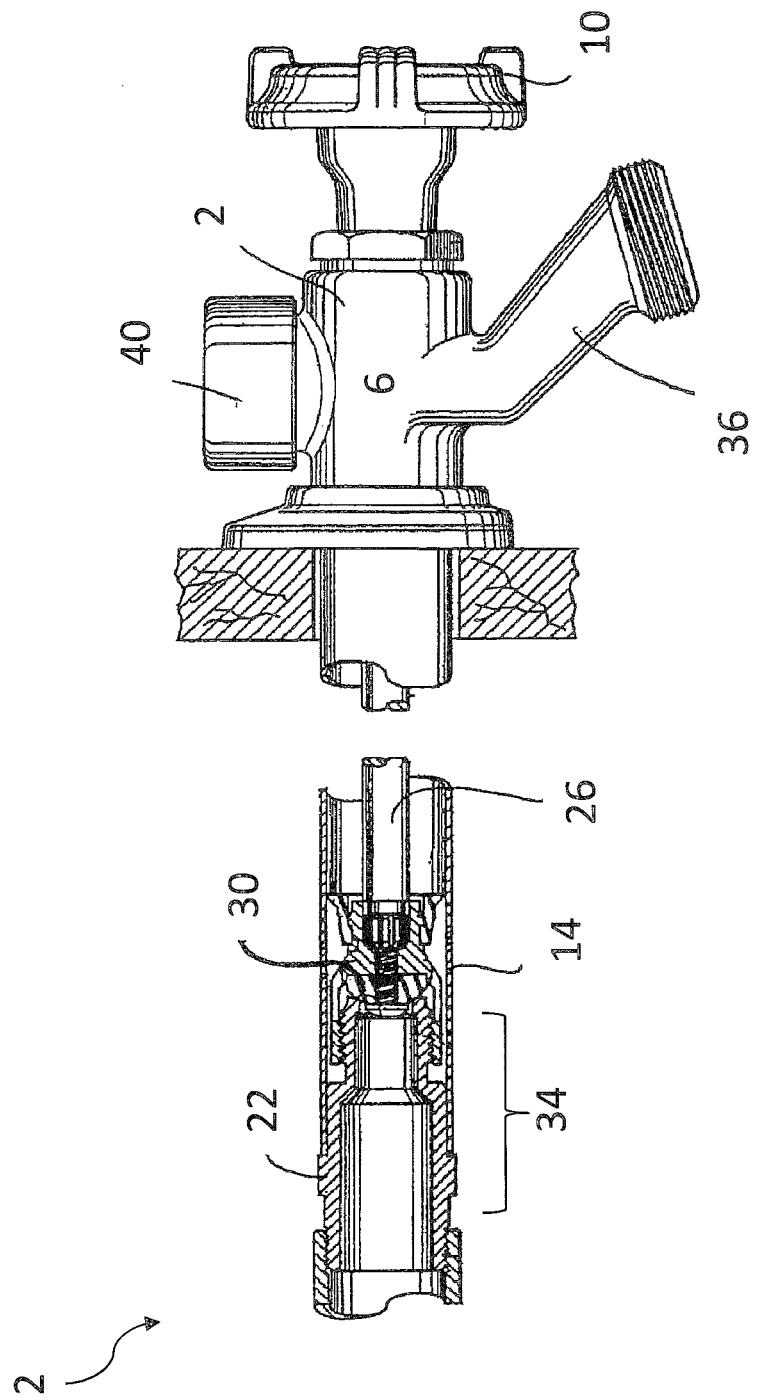
FIG. 1 is a partial cross sectional view of a typical hydrant assembly.
Figure 2:
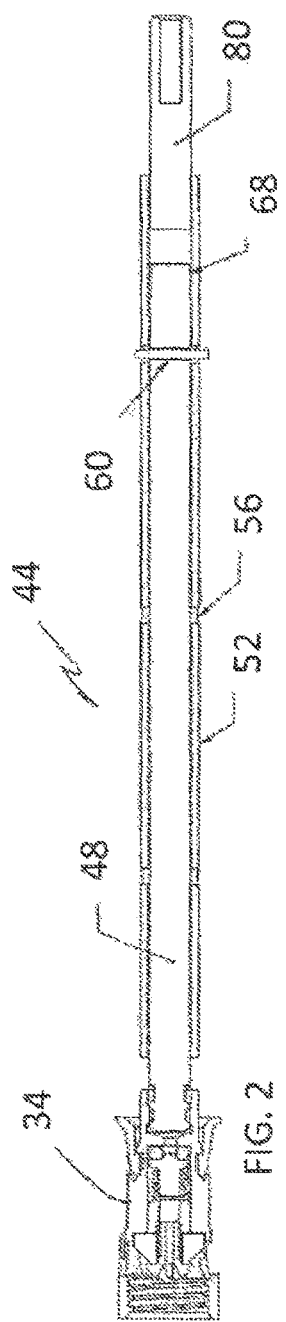
FIG. 2 is a cross-sectional elevation view of a hydrant assembly with an adjustable operating rod according to one embodiment of the invention.
Figure 3:
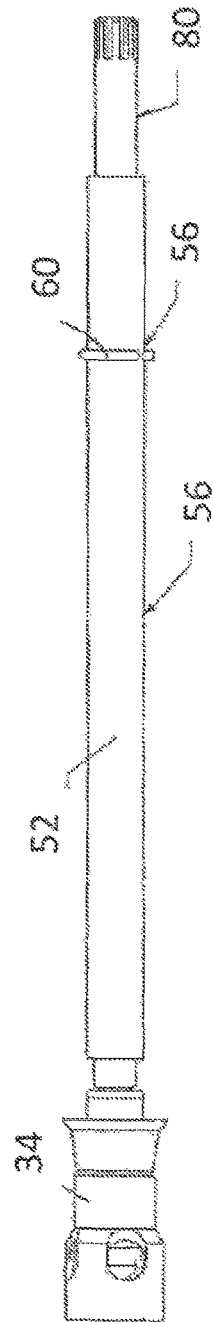
FIG. 3 is an elevation view of the adjustable operating rod shown in FIG. 2.
Figure 4:
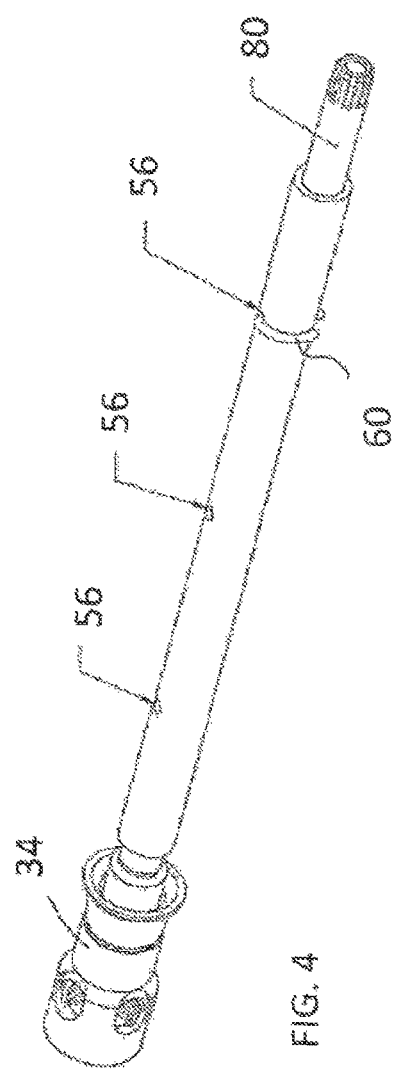
FIG. 4 is a perspective view of the adjustable operating rod of FIG. 2.
Figure 7:
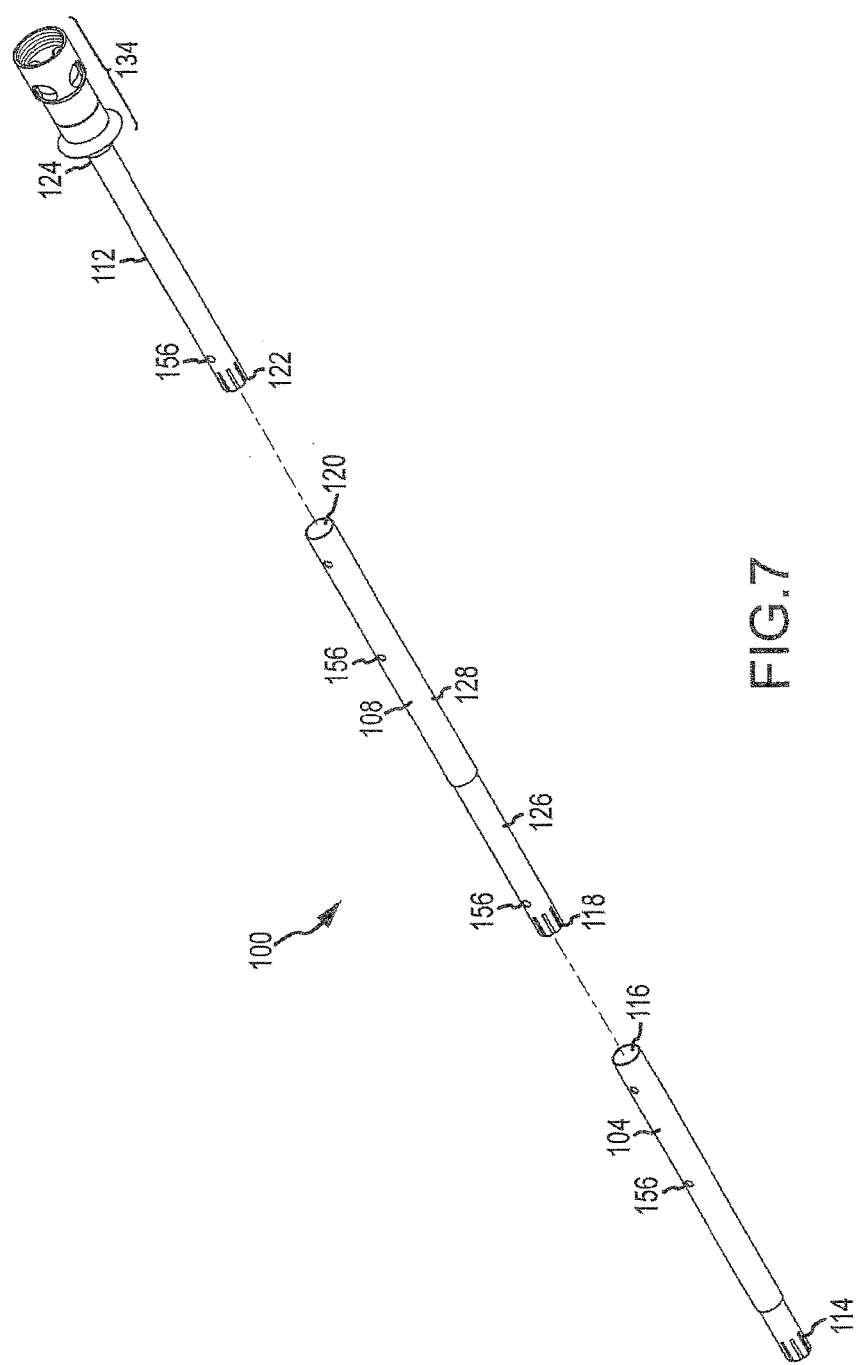
FIG. 7 is an exploded perspective view of another embodiment of the present invention.
Figure 8:
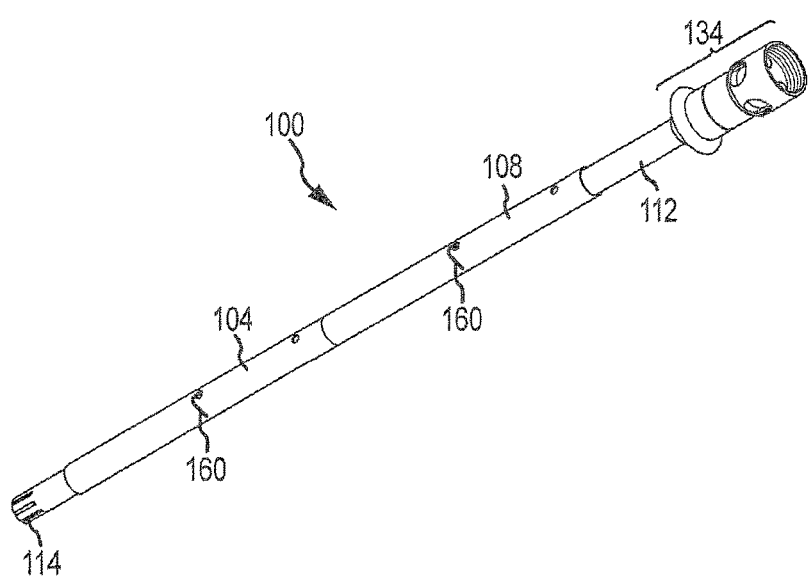
FIG. 8 is a perspective view of the embodiment of the present invention shown in FIG. 7.

To assist in the understanding of one embodiment of the present invention the following list of components and associated numbering found in the drawings is provided herein:

| #   | Components               |
| --- | ------------------------ |
| 2   | Hydrant assembly         |
| 6   | Housing                  |
| 10  | Handle                   |
| 14  | Fluid inlet pipe         |
| 22  | Inlet fitting            |
| 26  | Operating rod            |
| 30  | Plunger                  |
| 34  | Inlet valve              |
| 36  | Outlet                   |
| 40  | Vent                     |
| 44  | Adjustable operating rod |
| 48  | Inner rod                |
| 52  | Outer tube               |
| 56  | Aperture                 |
| 60  | Pin                      |
| 64  | First end                |
| 68  | Hexagonal outer surface  |
| 76  | Second end               |
| 80  | Adapter                  |
| 100 | Hydrant Assembly         |
| 104 | First Member             |
| 108 | Second Member            |
| 112 | Third Member             |
| 114 | First end                |
| 116 | Second end               |
| 118 | First end                |
| 120 | Second end               |
| 122 | First end                |
| 124 | Second end               |
| 126 | First Portion            |
| 128 | Second Portion           |
| 134 | Inlet Valve              |
| 156 | Aperture                 |
| 160 | Pin                      |

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

FIG. 1 is a hydrant assembly 2 of the prior art that generally includes a housing 6 that is interconnected to a fluid inlet pipe 14. A handle 10 is also operatively associated with the housing 6. The fluid inlet pipe 14 is also interconnected to an inlet fitting 22 that is associated with the fluid source of a building. The fluid inlet pipe 14 includes an operating rod 26 that is associated with the handle 10 that is interconnected to a plunger 30 that selectively moves into and out of the inlet fitting 22 to form an inlet valve 34. As used herein "plunger" refers to any device or member that selectively moves to control the flow of fluid through the fluid inlet pipe 6. Rotation of the handle 10 moves the operating rod 26 and thus moves the plunger 30 into or out of the inlet fitting 22 to begin or cease the flow of fluid through the fluid inlet pipe 14.

Referring now to FIGS. 2-6, an adjustable operating rod 44 according to various embodiments of the present invention is shown. Generally, operating rods 44 are provided in standard sizes, for example, 8 inch, 10 inch and 12 inch lengths. Obvious problems arise when, for example, a plumber attempts to install an 8 inch operating rod or a 12 inch operating rod into a system requiring a 10 inch operating rod. By not having the proper length operating rod on hand, time and complications related to the repair procedure are increased. The adjustable operating rod 44 includes an inner rod 48 fitted within a concentric outer tube 52 When not interconnected, the rod 48 and the tube 52 are translatable with respect to one another in a telescoping manner. In a preferred embodiment, the outer tube 52 is provided with a plurality of holes or apertures 56 for aligning with corresponding apertures of the rod 48 and for further receiving a pin 60 to secure the rod 48 and tube 52 at a desired length. The location of the apertures 56 in the tube 52 in combination with the position of one or more apertures on the rod 48, correspond to final working lengths of the secured assembly (e.g. 8 inch, 10 inch, 12 inch, etc.). Accordingly, embodiments of the present invention are suitable for use with a variety of hydrant assemblies and may be quickly adjusted in the field to be compatible with a variety of existing systems.

In one embodiment, a first end 64 of the rod 48 comprises a hexagonal outer surface 68 for receiving a tool. The hexagonal outer surface 68 is provided as a fail-safe element, such that if the tube 52 were to become disconnected from the inner rod 48, the inner rod 48 would not be stranded within the tube. The hexagonal outer surface may be accessed, loosened, and/or removed by various tools. One of skill in the art will recognize that any number of similar tool-receiving features may be provided to assist in the removal of the inner rod 48 in these situations.

Although FIGS. 2-6 depict a pin 60 according to one embodiment, it will be expressly understood that the present invention is not limited to a particular pin, pin arrangement, or even a particular number of pins. Indeed, cotter pins, e-clips, c-clips, screws, devises, and various similar devices are within the scope and spirit of the present invention. Pins of the present invention are contemplated as being generally easy to install and remove, fit inside the hydrant and are adapted to survive the life of the product.

FIG. 5 provides a cross-sectional view of the adjustable operating rod 44 according to one embodiment of the present invention. To provide the desired length, the inner rod 48 is slidingly engaged within the outer tube 52. One of skill in the art will appreciate that the rod, i.e., the member that interconnects to the inlet valve 34, may be hollow and the tube, i.e., the component that interconnects to the handle, may be solid without departing from the scope of the invention. Further, both the rod 48 and the tube may be completely or partially hollow. The outer surface of the inner rod 48 and the inner surface of the outer tube 52 may include a key and a key way, corresponding splines, or other engaging features that rotationally fix the inner rod 48 to the outer tube 52. The inner rod 48 and the outer tube 52 may be connected at least in part by mating spline features, such as one or more male features that mate with one more female features.

The inner rod comprises a plurality of apertures 56 for receiving a pin 60. Although the figures depict the apertures 56 arranged linearly, some embodiments of the present invention comprise an outer tube 52 and/or inner rod 48 with a series of radially disposed apertures, such that the outer tube 52 and inner rod 48 may be secured at various rotational orientations. While various embodiments contemplate an inner rod 48 having a plurality of apertures corresponding to a plurality of apertures provided on the outer tube 52, it will be expressly recognized that the inner rod 48 and outer tube 52 need not have complementary apertures. For example, one embodiment contemplates the inner rod 48 having a single aperture which may be aligned with any one of a plurality of radially disposed apertures in the outer tube 52 or vice versa. In another embodiment, it is contemplated that the outer tube 52 and inner rod 48 each comprise a pair of apertures that align or correspond to one another, thereby enabling a pin or connector to be disposed through the entire diameter of the outer tube 52.

FIGS. 7-10 illustrate another method of rendering an operating rod 100 adjustable. More specifically, in this embodiment of the present invention, the operating rod 100 includes three components—a first member 104, a second member 108, and a third member 112—which are fixed relative to each other with a pin 160 that is inserted through apertures 156 similar to that described above. One of skill in the art will appreciate that more than three components interconnected in any number of ways as discussed herein, or generally known in the art, can be employed to provide the contemplated adjustability.

In this embodiment, the first member 104 is interconnected to the second member 108, which is further interconnected to a third member 112. The first component includes a first end 114 and a second end 116. The first end 114 is adapted to receive a handle or a key, which controls the movement of the operating rod 100. The second end 116 is opened and receives a first end 118 of the second member 108. One of skill in the art will appreciate that the second end 116 may be inserted or otherwise interconnected to the first end 118 of the second member 108 without departing from the scope of the invention. The second member further includes a second end 120, which is opened for receiving a first end 122 of the third member 112. The second end 124 of the third member 112 is associated with an inlet valve 134. In this embodiment, the first ends 114, 118, and 122 of the components may be adapted to receive a key or a handle. In addition, the second member 108 comprises a first portion 126 and a second portion 128, wherein the first portion 126 has a diameter that is less than the diameter of the second portion 128. In operation, the smaller diameter first portion is inserted into the open, second end 116 of the first member. Again, one of skill in the art will appreciate that the first end 116 of the first member 104 may be inserted or otherwise interconnected to the second member 108.

Figure 9:
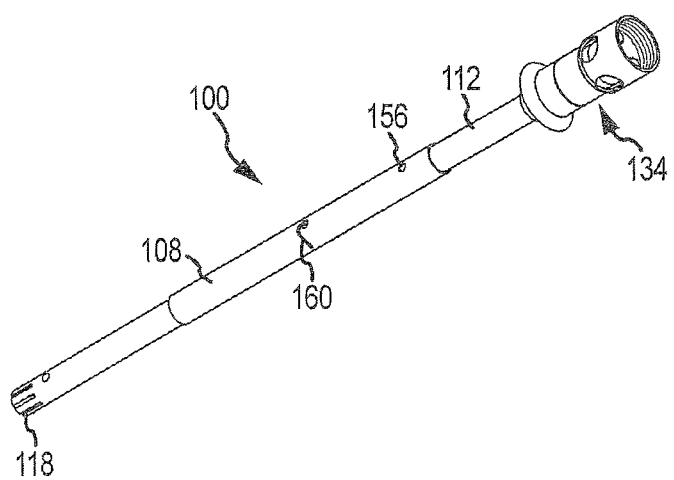
FIG. 9 is a perspective view of another embodiment of the present invention similar to that of FIG. 7.

Referring now to FIG. 9, a second way of assembling the control rod 100 of this embodiment is shown. Here, the first member is omitted and the second portion is interconnected to the third member 112. The second member 108 and the third member 112 are interconnected by way of a pin 160 that is inserted through apertures 156 in the respective members. One of skill in the art will appreciate that other interconnected mechanisms are contemplated. This assembly shows that the elongated assembly of FIGS. 7 and 8 can be shortened as needed.

Figure 10:
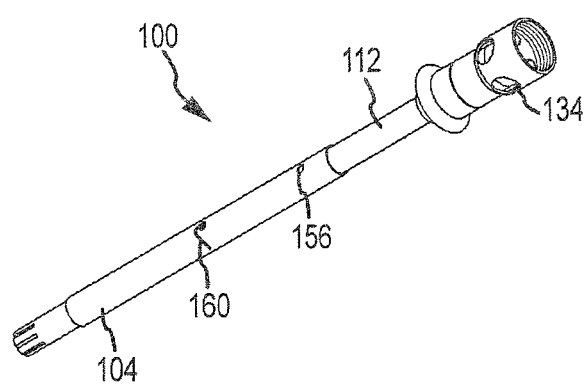
FIG. 10 is another embodiment of the present invention similar to that shown in FIG. 7.

FIG. 10 shows yet another way of interconnecting the members. Here, the first member 104 is interconnected to the third member 112. Again, a pin 160 is used, which is placed within apertures 156 of adjacent members, to interconnect the first member to the third member. This configuration also illustrates how a multi-membered operating rod 100 allows the end user to selectively alter operating rod length to accommodate fluid inlet pipes of various lengths.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. An operating rod for a hydrant assembly, the operating rod comprising:
    a handle end comprising an outer surface configured to receive a tool for manipulation of the operating rod;
    an opposite valve end comprising at least a portion of an inlet valve; and
    two or more members selectively connectable to one another to define an overall length of the operating rod, wherein at least one of the two or more members comprises the handle end and only one of the two or more members comprises the valve end, and wherein when the two or more members are connected to one another, rotation induced into the operating rod at the handle end is transferred to the valve end.

2. The operating rod of claim 1, wherein each of the two or more members comprise a first end and an opposite second end, and wherein the first end of each of the two or more members comprises the outer surface, and the second end of one or more of the two or more members comprises an opening configured to receive the first end.

3. The operating rod of claim 2, wherein the first end comprises a first diameter and the second end comprises a second diameter, the first diameter less than the second diameter.

4. The operating rod of claim 1, further comprising a pin, wherein each of the two or more members comprise a first end, an opposite second end, and one or more apertures defined therein, and wherein when the first end of one of the two or more members is connected to the second end of another of the two or more members, corresponding apertures align for receipt of the pin.

5. The operating rod of claim 4, wherein when the pin is received within the one or more apertures, a first portion of the pin extends through the one or more apertures and through a diameter of the first end and the second end, and a second portion of the pin extends around an outer circumferential portion of the second end.

6. The operating rod of claim 1, further comprising a handle configured to couple to the handle end.

7. The operating rod of claim 1, wherein the inlet valve comprises a plunger and an inlet fitting, and wherein the valve end comprises the plunger.

8. The operating rod of claim 1, wherein the overall length is adjustable.

9. The operating rod of claim 1, wherein the overall length comprises at least one of 8 inches, 10 inches, and 12 inches.

10. An adjustable operating rod kit comprising:
    an inlet valve;
    a first member comprising a first end and an opposite second end, the second end comprising the inlet valve;
    a second member comprising a third end and an opposite fourth end; and
    a third member comprising a fifth end and an opposite sixth end, wherein the first member, the second member, and the third member are selectively connectable to one another forming an operating rod for use with a hydrant assembly, and wherein the first end, the third end, and the fifth end each comprise an outer surface configured to receive a tool for manipulation of the operating rod.

11. The kit of claim 10, wherein the fourth end and the sixth end each comprise an opening configured to receive one of the first end, the third end, or the fifth end.

12. The kit of claim 10, further comprising one or more pins, wherein the first member further comprises an aperture defined proximate the first end, the aperture configured to receive the one or more pins and secure one of the fourth end or the sixth end to the first member.

13. The kit of claim 10, further comprising one or more pins, wherein the second member further comprises:
   a first aperture defined proximate the third end, the first aperture configured to receive the one or more pins and secure the sixth end to the second member;
   a second aperture defined proximate the fourth end, the second aperture configured to receive the one or more pins and secure one of the first end or the fifth end to the second member; and
   a third aperture defined between the first aperture and the second aperture, the third aperture configured to receive the one or more pins and secure one of the first end or the fifth end to the second member.

14. The kit of claim 10, further comprising one or more pins, wherein the third member further comprises:
   a first aperture defined proximate the sixth end, the first aperture configured to receive the one or more pins and secure one of the first end or the third end to the third member; and
   a second aperture defined between the first aperture and the fifth end, the second aperture configured to receive the one or more pins and secure one of the first end or the third end to the third member.

15. The kit of claim 10, further comprising a fourth member, the fourth member comprising a tube positionable around at least a portion of the first member proximate the inlet valve.

16. The kit of claim 10, further comprising a substantially round handle selectively connectable to one of the first end, the third end, and the fifth end.

17. The kit of claim 10, wherein the first member, the second member, and the third member each comprise a different length.

18. The kit of claim 17, wherein the second member and the third member each comprise indicia associated with the length.

19. The kit of claim 18, wherein the indicia comprises color coded indicia.

* * * * *